United States Patent
Riffel et al.

(10) Patent No.: US 6,581,652 B2
(45) Date of Patent: Jun. 24, 2003

(54) MELTING TANK WITH A CLOSABLE BATCH LOADING CHANNEL

(75) Inventors: Benno Riffel, deceased, late of Alsheim (DE), by Ursula Riffel, legal representative; Johann Faderl, Nieder-Hilbersheim (DE); Klaus Megges, Mainz (DE); Ralf Reiter, Mainz-Kastel (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/915,223

(22) Filed: Jul. 25, 2001

(65) Prior Publication Data
US 2002/0123304 A1 Sep. 5, 2002

(30) Foreign Application Priority Data
Aug. 8, 2000 (DE) .......................... 100 38 597

(51) Int. Cl.⁷ ................................. B65B 1/04
(52) U.S. Cl. .................. 141/82; 141/93; 222/146.1; 222/146.2
(58) Field of Search .............................. 141/82, 85, 93; 222/146.1, 146.2

(56) References Cited

U.S. PATENT DOCUMENTS 6,371,174 B1 * 4/2002 Zook et al. .................. 118/302

FOREIGN PATENT DOCUMENTS

DE          39 08 265          9/1990

* cited by examiner

Primary Examiner—Steven O. Douglas
(74) Attorney, Agent, or Firm—Pauley Petersen Kinne & Erickson

(57) ABSTRACT

A melting tank with a batch loading channel, with a channel covering having an exhaust gas flue and a loading opening that can be closed by a loading door or flap during operation of the melting tank and the loading opening can be opened for loading the batch. Emissions and service life improvements can be achieved because during operation of the melting tank, a constant air stream is introduced into the loading channel by nozzles in the closed loading door or flap. While loading the batch, the loading door or flap is moved sufficiently far so that the nozzles are moved out of the region of the loading channel, and the loading door or flap covers the region underneath the channel covering with a suction device. A region of the loading opening underneath the channel covering is opened for a loading device.

8 Claims, 1 Drawing Sheet

MELTING TANK WITH A CLOSABLE BATCH LOADING CHANNEL

BACKGROUND OF THE INVENTION

1. Field of the Invention

This invention relates to a melting tank with a batch loading channel, with a channel covering that has an exhaust gas flue and a loading opening can be closed by a loading door or a loading flap during operation of the melting tank and can be opened for inserting the batch.

2. Description of Related Art

During batch loading in particular, such melting tanks often cause heavy dust contamination and gas formation at the loading opening, wherein portions of the batch or furnace atmosphere are released into open air. These harmful emissions must be captured. In addition, interaction with the batch components leads to an attack on the material of the loading channel and the loading door or flap that closes the loading opening. Furthermore, these materials are deposited on the parts and must be removed using expensive cleaning or repair measures.

SUMMARY OF THE INVENTION

For a melting tank of the mentioned type, it is one object of this invention to easily capture the emissions occurring when loading batches in the region of the loading door or flap and the loading channel and to reduce their harmful effects in the region of these apparatus parts.

This object is achieved according to this invention because during operation of the melting tank, a constant air stream is introduced into the loading channel with nozzles in the closed loading door or flap. During the loading of batches, the loading door or flap is moved sufficiently far so that the nozzles are moved out of the area of the loading channel, and the loading door or flap covers the region underneath the channel covering with a suction device. A region of the loading opening underneath the channel covering is opened for a loading device.

With this configuration, during the operation of the melting tank, an air pocket is created underneath the exhaust gas flue of the loading channel. This air pocket essentially prevents the penetration of contaminants from the surrounding air into the melt and prevents the advance of particles and exhaust gas out of the melting system into the loading channel and thus into the surroundings. Therefore, deposits are prevented in the loading channel and attacks by the aggressive substances on the material of the loading channel are minimized. In addition, the cooling leads to considerably less material stress. The overall service lifetime of the relevant apparatus parts is thus lengthened and cost-intensive cleaning and repair work is decreased.

While loading the batch, a significant part of the upper portion of the loading channel is closed by the moved loading door or flap, so that burst-like currents of exhaust gas, particles and exhaust gas, occurring during the loading of the batch can be effectively suctioned off by the suction flue or the suction device that is moved into the loading opening in the lower region of the loading channel when the loading door or flap is moved into the opened position. Thus, the emissions are clearly reduced. In addition, the formation of a gas stream is positively affected by the loading device.

The construction of the system remains simple and the system parts are exposed to reduced deposits of harmful material, so that as a whole, the service life of the parts is increased.

For introducing an air stream into the loading channel, according to one embodiment the loading door has an air connector that connects to nozzles that are constructed as porous stone surfaces of the loading door.

The movement of the loading door from the closed position into the opened position follows a simple configuration so that the loading door can be moved vertically upward for opening the loading opening, wherein the channel covering covers the nozzles directed into the loading channel, and the suction device arranged in the lower region of the loading door is moved from the closed position against the lower channel wall and into the upper region of the loading channel.

The channel covering and the lower channel wall are made of fireproof material, like the loading door or flap. The loading device for the batch can be constructed as a loading trowel in one embodiment.

This invention can also be used in equally advantageous ways with other configurations of the loading opening and the loading systems.

BRIEF DESCRIPTION OF THE DRAWINGS

This invention is explained in more detail with reference to an embodiment shown in the drawing, wherein.

DESCRIPTION OF PREFERRED EMBODIMENTS

The drawings only show the loading region of the melting system which is meaningful for explanation of this invention, and which comprises the region of the loading opening and the loading channel 30 with the exhaust flue 12, for example the loading region of the schematically indicated melting tank 10.

Figure 1:
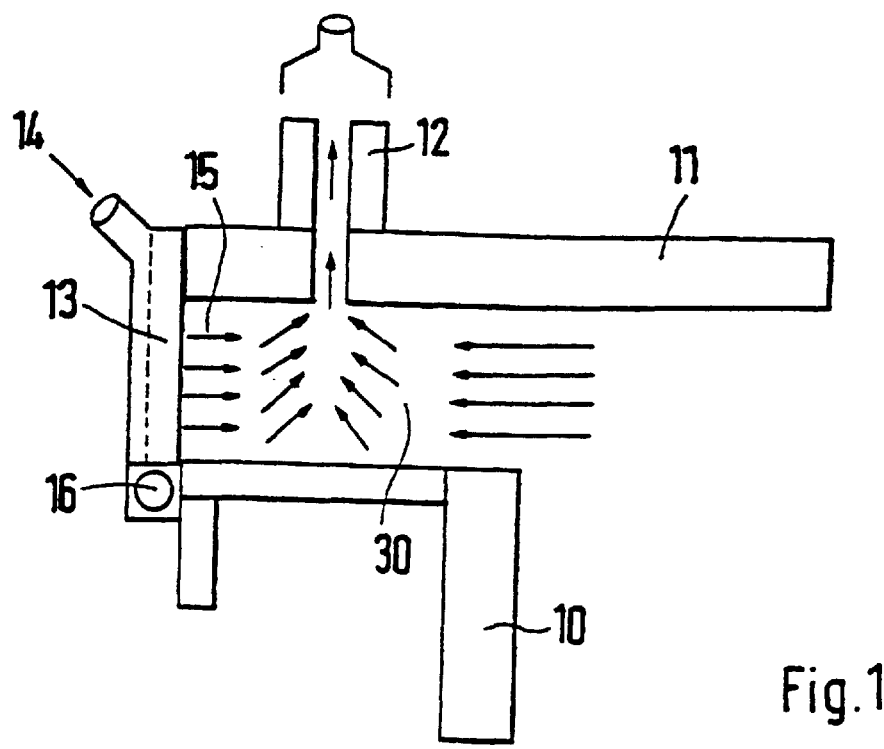
FIG. 1 is a schematic view of a part of the melting system with the closed loading opening and the loading channel.

As shown in FIG. 1, the loading channel 30 arranged before the melting tank 10 is bounded by a channel covering 11 and a lower channel wall 31. The exhaust gas flue 12 branches off from the channel covering 11. The loading opening of the loading channel 30 is closed during operation of the melting tank 10 by means of a loading door 13. A ventilation system is integrated in the loading door 13 with an air connector 14 and nozzles 15. A constant air stream can be supplied by this ventilation system into the loading channel 30. The nozzles 15 in the loading door 13 that is made of fireproof material are preferably constructed as porous stone surfaces, but they can also have additional openings.

As indicated in FIG. 1 by the arrows, an accumulation of air is formed in the region of the exhaust gas flue 12 with the exhaust gas stream exiting from the melting tank 10, so that a definite suction is achieved. In addition, a clear separation of the outside air and the melting tank is achieved, so that there are no environmental effects on the melt material in the melting tank 10 and also no emissions from the loading channel 30 into the outside air.

Figure 2:
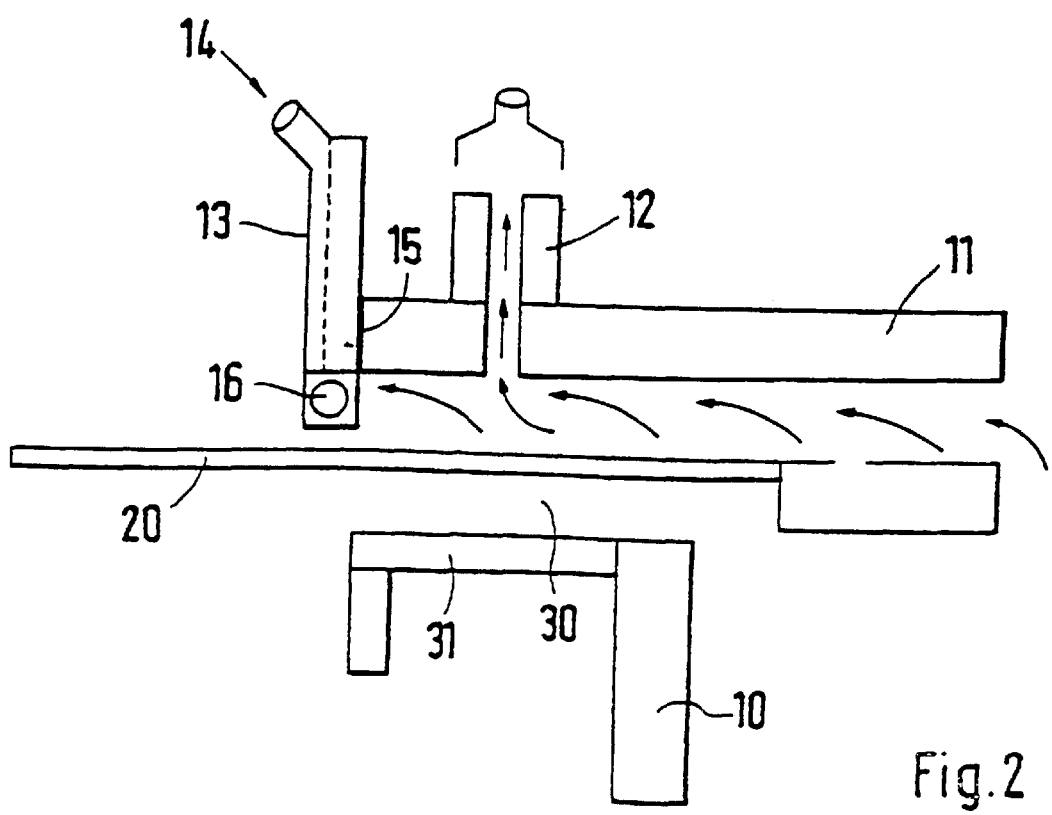
FIG. 2 is a schematic view of the same part of the melting system for an opened loading opening.

As FIG. 2 shows, the loading door 13 can be moved upward for opening the loading opening of the loading channel 30. In this way, the nozzles 15 are closed by the channel covering 11 or moved outside of the loading channel 30. However, the lower region of the loading door 13 with a suction device 16 remains in the upper part of the loading opening, so that the exhaust gas stream occurring over the loading trowel as a loading device 20 can be forced into this region, which is an advantage for good suction through the exhaust gas flue 12. Thus, by directly loading batches into the melting tank 10, the emission from the loading channel 13 into the outside air can be considerably reduced. In addition, deposits on the loading channel 30 and the loading door 13 can be reduced.

Instead of a moving loading door 13, these same functions can also be performed by a loading flap on the loading opening of the loading channel 30 and other loading devices 20 can also be used as the loading system.

What is claimed is:

1. In a melting tank with a batch loading channel and a channel covering having an exhaust gas flue and a loading opening that is closed by at least one of a loading door or a flap during operation of the melting tank and that is opened for loading the batch, the improvement comprising: during operation of the melting tank (10) introducing a constant air stream into the loading channel (30) with nozzles (15) in at least one of the closed loading door (13) and the flap while loading the batch moving at least one of the loading door (13) and the flap sufficiently far for the nozzles (15) to move out of a region of the loading channel (30) and covering with the at least one of the loading door (13) and the flap covering underneath the channel covering (11) having a suction device (16), and opening a second region of the loading opening underneath the channel covering for a loading device (20).

2. In the melting tank according to claim 1, wherein the loading door (13) has an air connector (14) that connects to the nozzles (15) constructed as porous stone surfaces of the loading door (13).

3. In the melting tank according to claim 2, wherein the loading door (13) moves vertically upward for opening the loading opening, the channel covering (11) covers the nozzles (15) directed into the loading channel (30), and the suction device (16) arranged in a lower region of the loading door (13) is moved from a closed position against a lower channel wall (31) and into an upper region of the loading channel (30).

4. In the melting tank according to claim 3, wherein the channel covering (11) and the lower channel wall (31) of the loading channel (3) and the loading door (13) are made of a fireproof material.

5. In the melting tank according to claim 4, wherein the loading device (20) is designed as a loading trowel.

6. In the melting tank according to claim 1, wherein the loading door (13) moves vertically upward for opening the loading opening, the channel covering (11) covers the nozzles (15) directed into the loading channel (30), and the suction device (16) arranged in a lower region of the loading door (13) is moved from a closed position against a lower channel wall (31) and into an upper region of the loading channel (30).

7. In the melting tank according to claim 1, wherein the channel covering (11) and a lower channel wall (31) of the loading channel (3) and the loading door (13) are made of a fireproof material.

8. In the melting tank according to claim 1, wherein the loading device (20) is designed as a loading trowel.

* * * * *